F. & J. F. NELSON.
LOOPING MACHINE FOR HOSIERY.
APPLICATION FILED AUG. 20, 1908.

928,787.

Patented July 20, 1909.
4 SHEETS—SHEET 1.

Witnesses:
Wm. P. Bond
Pierson W. Banning

Inventors
Frithiof Nelson
John F. Nelson
by Banning & Banning
Attys.

F. & J. F. NELSON.
LOOPING MACHINE FOR HOSIERY.
APPLICATION FILED AUG. 20, 1908.

928,787.

Patented July 20, 1909.
4 SHEETS—SHEET 2.

Witnesses:

Inventors
Frithiof Nelson
John F. Nelson
by Banning & Banning
Attys.

F. & J. F. NELSON.
LOOPING MACHINE FOR HOSIERY.
APPLICATION FILED AUG. 20, 1908.

928,787.

Patented July 20, 1909.
4 SHEETS—SHEET 3.

Witnesses:
Wm P. Bond
Pierson W. Banning

Inventors
Frithiof Nelson
John F. Nelson
by Banning & Banning
Attys

UNITED STATES PATENT OFFICE.

FRITHIOF NELSON AND JOHN F. NELSON, OF ROCKFORD, ILLINOIS, ASSIGNORS TO FOREST CITY KNITTING COMPANY, OF ROCKFORD, ILLINOIS, A CORPORATION OF ILLINOIS.

LOOPING-MACHINE FOR HOSIERY.

No. 928,787.           Specification of Letters Patent.           Patented July 20, 1909.

Application filed August 20, 1908. Serial No. 449,460.

*To all whom it may concern:*

Be it known that we, FRITHIOF NELSON and JOHN F. NELSON, both citizens of the United States, and both residing at Rockford, in the county of Winnebago and the State of Illinois, have invented certain new and useful Improvements in Looping-Machines for Hosiery, of which the following is a specification.

In the making of hosiery on machines of well known type, it is the practice to knit the leg of the sock on one machine and the ribbed upper of the sock on another machine, and to then unite the portions thus knitted by stitching them together on a looping machine. In the operation of the looping machine as at present practiced, it is customary to secure the body of the sock and the upper together on a circular head, the teeth of which are entered through the adjacent fabrics and serve to hold them distended and in position during the stitching operation. After the stitching, it is customary to transfer the head with the stitched sock to a pair of shears which cut away the surplus fabric beyond the stitching, and after this shearing operation the head, with the sock still carried thereby, is mounted in position to coact with a brush which removes the surplus lint or threads from the fabric.

The several operations above referred to are successively performed by manually removing the head from one device to another, so that the several operations may be performed in succession. This manual manipulation of the sock is very wasteful in time, and further requires care in the successive adjustments of the parts in order that the various stages of the work may be perfectly performed.

The object of the present invention is to construct a machine which combines within itself a shearing, a stitching, and a brushing mechanism coöperating with a revoluble carrier having mounted thereon a plurality of heads so positioned and adjusted that the carrier may be moved from one position to another, permitting the several operations to be performed in succession without manipulation on the part of the operator, thereby permitting the operator to devote his entire time to the work of mounting the sock portions in position to be carried to the various points of operation. This method of performing the work provides for great accuracy and perfection in the work, in that each of the operations will be regulated automatically and without the necessity for careful supervision on the part of the operator.

The machine is so constructed that it can be readily operated from a convenient point within easy reach of the operator and effects a great saving in space as well as time by reason of the compact arrangement of the several instrumentalities required in performing the various portions of the work.

Further objects will appear from a detailed description of the invention, which consists in the features of construction and combination of parts hereinafter described and claimed.

In the drawings, Fig. 5 a top or plan view of the cam and dog for actuating the stop ratchet wheel; Fig. 6 a side elevation of the eccentric for actuating the stitching needle; Fig. 7 a view of the dog and ratchet for actuating the carrier heads.

The machine comprises a bed plate 12 from which springs a bracket arm 13 in the form of a bent elbow, which carries at its outer end a socket head 14 which has entered thereinto the end of an obliquely extending stationary shaft 15 which serves as a mounting for the rotary carrier 16. The rotary carrier comprises a flat head 17 from which extend four arms 18, which arms project at an angle of 45° with respect to the stationary shaft and are equidistant with respect to one another. Each of the arms terminates in an inwardly extending journal sleeve 19 which projects at right angles with respect to the arm to which it is attached. Each of the journal sleeves has rotatably mounted therein a stub shaft 20 which carries, at its inner end, a beveled pinion 21. The arrangement is one which brings all the beveled pinions into close proximity with the stationary shaft which has rotatably mounted thereon a driving beveled pinion 22 which is connected, by means of a sleeve 23, with a ratchet wheel 24 immediately below the end of the socket head 14 which clamps the end of the stationary shaft. The driving beveled pinion 22 occupies the position at the center of the four beveled pinions 21, so that rotative motion imparted to the driving pinion will be simultaneously imparted to all of the meshing pinions on the several stub shafts. Each of the stub shafts carries, at its outer end, a carrier head 25 of the type ordinarily employed for distending the ends of the sock members intended to be stitched on the looper. The carrier head, in brief, is in the form of a disk 26 hollowed out on its inner side 27 to provide a slight concavity, through the center of which the stub shaft is entered. The head is provided, around its periphery, with a plurality of pins 28 equal in number to the stitches intended to be made on the looper. In order to permit any one of the carrier heads to maintain a stationary position without interfering with the operation of the remaining carrier heads, each of the journal sleeves 19 has pivoted thereto a spring lever 29 provided, in its end, with an inwardly extending pin 30 which is adapted to engage a groove 31 in the stub shaft 20, which latter is longitudinally adjustable within its journal sleeve. By depressing the lever and raising the pin the shaft, as a whole, can be retracted, throwing the pinion 21 out of mesh with the center driving pinion.

Figures 2, 3:
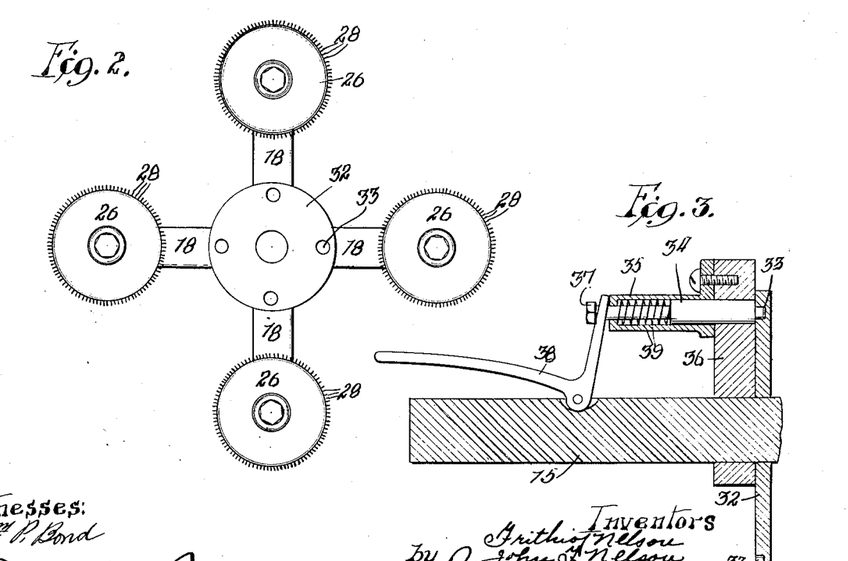
Fig. 2 an under face view of the diagonally pivoted rotary carrier.
Fig. 3 an enlarged detail, partly in section, showing the centering pin 80 for the carrier.

In order to permit the rotary carrier to be revolved, the head 17 has secured thereto, on its under face, a disk or plate 32, best shown in Fig. 2, provided with four equidistant holes 33 in register with the respective arms, which holes are adapted to be brought into register with the inner end of a centering pin 34, which is entered through a socket sleeve 35 carried by an arm 36 through which the stationary shaft 15 is entered, which arm occupies the position immediately adjacent and below the disk or plate 32. The rear end of the pin 34 is provided with a head 37 which receives the end of an L lever 38 pivoted to the stationary shaft. The sleeve 35 has located therein a coil spring 39 which encircles the pin and is adapted to hold the same in projected position, permitting retraction of the pin by the action of the L lever 38. By depressing the lever, the pin can be retracted from one of the holes 33 and the rotary carrier revolved until the pin is brought into position to enter the next adjacent hole, after which the carrier can be locked in its second position until further adjustment is required. The ratchet wheel 24 coacts with an operating dog 40 carried by a swinging arm 41, which is pivoted on the stationary shaft, immediately above the ratchet wheel 24, which operating dog 40 is supplemented by a secondary dog 42 adapted to prevent return movement of the ratchet, which secondary dog is carried by a bracket 43 connected with the side of the socket head 14. The ratchet wheel 24 is provided with teeth equal in number to the pins 28 on each of the four carrier heads; and the center bevel pinion and the four bevel pinions intermeshing therewith, all being of equal size, it follows that one complete revolution of the ratchet wheel will simultaneously afford a complete revolution of each of the carrier heads. The swinging arm 40 has pivoted thereto an operating rod 44, the inner end of which is connected with a pivoted arm 45 which is adapted to be rocked by the engagement of a cam 46 located on a power shaft 47. The upper or free end of the arm 45 has connected therewith a coil spring 48, the end of which is secured to a pin 49 outwardly projecting from the bent elbow frame 13 near the upper end thereof.

The shaft 47 has mounted thereon, immediately beneath the inner angle of the frame 13, a cam disk 50 which is similar in all respects to the cam disk ordinarily found on a looping machine of a class usually employed to stitch the uppers on the socks. In view of the fact that the stitching mechanism employed in the present invention is not in itself new, we deem it necessary to give only a brief description thereof.

The cam disk 50, which operates the stitching and looping mechanisms, is provided, on one side, with a circular cam ring 51 which is thickened at the point 52 to provide a raised peripheral surface at such point, and serves to impart a vertical movement to the looper arm 53, the inner end of which is held in position to engage the periphery of the cam ring 51, being pivoted, at its center, by a vertical pivot pin 54, to a pivotal block 55, which latter is pivoted, by a horizontal pin 56, between ears 57. This method of pivoting the looper arm serves to permit both a vertical and a horizontal movement which is necessary in performing the looping operation, the nature of which is well understood.

In order to provide the necessary lateral or horizontal movement, the face of the cam disk 50, outside the periphery of the cam ring 51, is irregular, being provided with a raised portion 58 and a depressed portion 59 which serve to impart a lateral movement to the looper arm coördinate with the vertical movement imparted thereto. The outer end of the looper arm has connected therewith a diagonally extending coil spring 60 which serves to hold the inner end of the arm in engagement with the cam surfaces of the disk. The outer end of the arm is provided with a tubular socket 61 which has entered thereinto a horizontally extending rod 62, the end of which is bent or turned to form a looper 63 of the usual character employed in mechanism intended to perform stitching of the kind required in the present invention. The looper coacts with the usual needle 64, which is entered into the lower end of a bell crank lever 65 pivoted at its elbow to a bracket arm 66 located immediately forward of the cam disk. During the stitching operation, the needle reciprocates in the usual manner between the pins of the carrier head, and the looper, which is substantially of L shape, works around the end of the needle and within the recess 27 in the face of the carrier head as the needle is thrust forward and back. This operation is so well understood in the present art that further description is deemed unnecessary.

Figure 4:
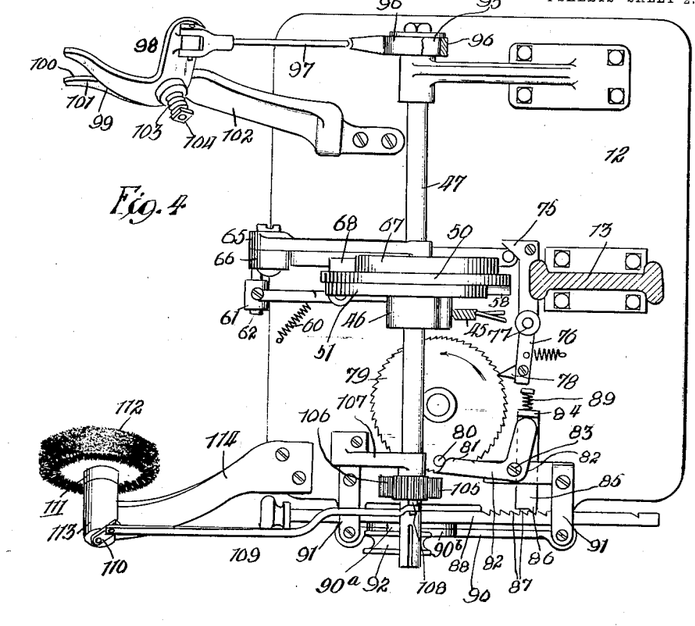
Fig. 4 a top or plan view of the machine, with the carrier removed and a portion of the frame in section.
Figures 5, 6, 7:
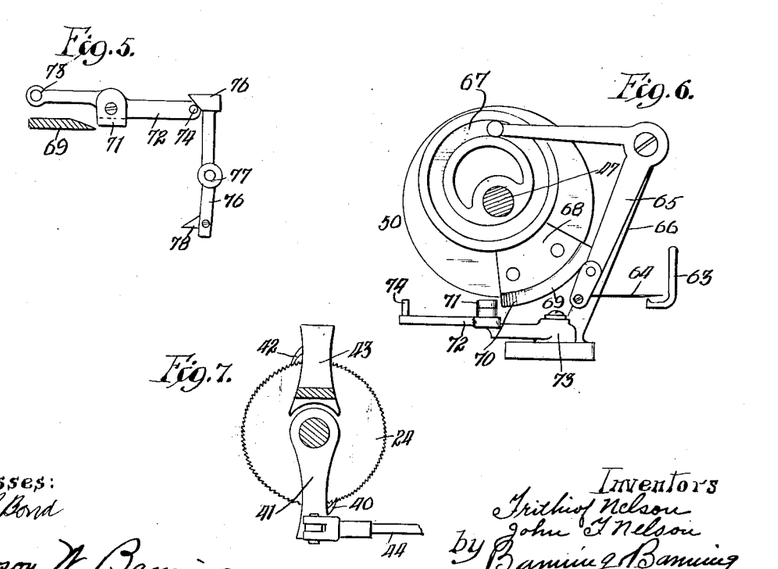
Figure 8:
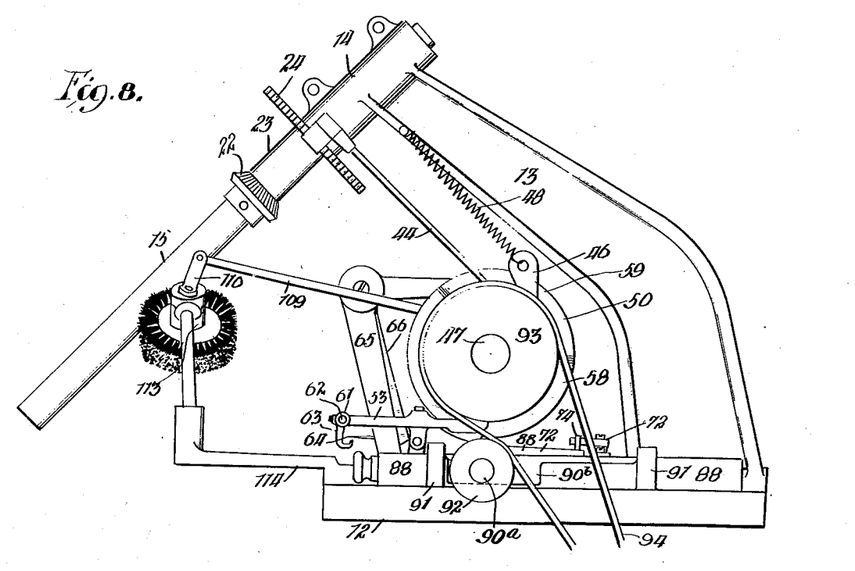
Fig. 8 a side elevation of the machine, showing the driving mechanism, and showing the carrier removed.
Figure 9:
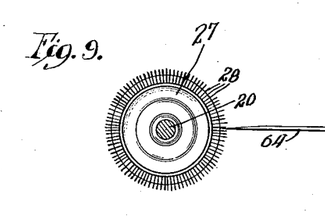
Fig. 9 a plan view of one of the carrier heads with the stitching needle in coacting relation therewith.
Figure 10:
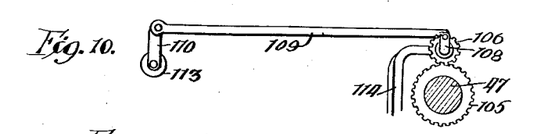
Fig. 10 a detail showing the pitman for driving the brush.
Figure 11:
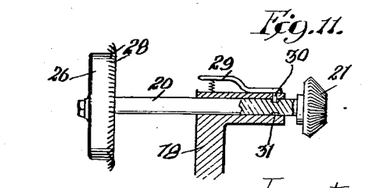
Fig. 11 a detail, partly in section, showing the driving shaft for one of the carrier heads.

The upper and inner end of the bell crank lever 65 is entered into a circular groove or channel 67 eccentrically formed on the face of the cam disk 50 opposite that previously described. As the cam disk is revolved, the bell crank lever, with the projecting needle, will be reciprocated, carrying the thread back and forth as the fabric is revolved by the carrier head, which for the time being is in stitching position. The face of the cam disk 50, immediately opposite the point of the greatest eccentricity of the groove 67, has secured thereto a segmental shaped plate 68, the edge 69 of which projects beyond the periphery of the cam disk and is beveled, at its forward end 70, to furnish a cam which is adapted to ride under the inner end of an inwardly projecting finger 71 mounted near the center of a swinging arm 72 pivoted, at its forward end 73, immediately beneath the lower end of the bell crank lever 65. The opposite free end of the swinging arm 72 is provided with an upwardly extending pin 74 which coacts with the inner face of a beveled finger 75 on the end of the ratchet arm 76, pivoted at its center 77, and provided, at its opposite end, with an inwardly extending dog 78 adapted to engage the teeth of a stop ratchet wheel 79 which lies in a horizontal plane and closely adjacent the upper face of the bed plate, as best shown in Fig. 4. The stop ratchet wheel is provided, at a suitable point near its periphery, with a stop pin 80 which is adapted, at a predetermined point in the revolution of the ratchet wheel, to engage the foot 81 of a lever 82, which is in the form of a bell crank and is pivoted, by means of a pin 83 entered through the knee of the lever. The free end of the bell crank lever is in engagement with a stop 84 on the inner end of a sliding bar 85 provided with a tooth 86 adapted to engage one of a series of notches 87 formed on the inner face of an idler bar 88. The tooth 86 on the sliding bar is adapted to be held in engagement with the selected notch by means of a spring 89 which bears against the stop 84; and the idler bar is slidably mounted within a guideway formed by a flange 90 near the edge of the bed plate. The idler bar is further positioned against removal from the guideway by a pair of cross plates 91 which bridge over the top of the bar and serve to hold the latter within the guideway provided therefor, permitting the idler bar to be moved back and forth to various positions of adjustment. The idler bar carries an outwardly projecting stub shaft 90$^a$ which has mounted thereon a grooved idler pulley wheel 92 which lies outside of the guide flange 90 and immediately beneath the driving pulley wheel 93 which carries a belt 94, the guide flange being cut away at 90$^b$ to permit the projection of the stub shaft. It is preferred to provide the stop ratchet wheel with a greater number of teeth than the operating ratchet wheel 24, in order that the machine may be operated to overlap the ends of the line of stitching sufficiently to prevent raveling.

Figure 12:
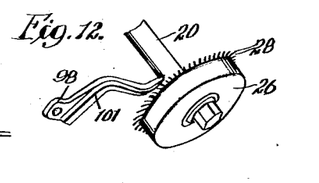
Fig. 12 a detail of the shears.

The shaft 47 is provided, near one end, with an eccentric 95 surrounded by an eccentric ring 96 which receives the end of a shear rod 97 adapted to actuate the movable member of a pair of shears. This member is in the form of an angle plate 98 provided, near its free end, with a beveled cutting edge 99 adapted to coöperate with the cutting edge 100 of a stationary shear member 101. The shears are mounted in an oblique plane and pivoted to the upper end of a bracket arm 102 secured to the bed plate. In order to hold the movable cutting member of the shears in coöperative position with the fixed member, a spring 103, adapted to be regulated by a nut 104, is provided, which arrangement serves to hold the cutting edges in coacting position. The location of the shears is one which enables the carrier head to swing over outside of the tip ends of the shear members to bring such members about a quarter of an inch from the surface of the pins on the inner side of the carrier head, as shown in Fig. 12.

Near the opposite end of the shaft 47 is located a driving gear wheel 105 which meshes with a smaller gear wheel 106 carried by a bracket 107. The smaller gear wheel is provided with a short crank 108 which has pivoted thereto the inner end of a pitman rod 109, the outer end of which is pivoted to a longer crank 110 on the end of a stub shaft 111 which carries a brush 112. The stub shaft is journaled within a sleeve 113 on the end of a bracket arm 114 which springs from the bed plate of the machine. The brush shaft extends at an oblique angle with respect to the bed plate, and the brush occupies a position such that the carrier head will be enabled to swing under the lower surface of the brush and clear the bracket arm 114 when moved from one position to another. The crank 108 is shorter than the crank 110, so that a revolution of the driving crank will impart but a partial revolution to the receiving crank, thereby giving to the brush a partial revolution in opposite directions.

Figure 1:
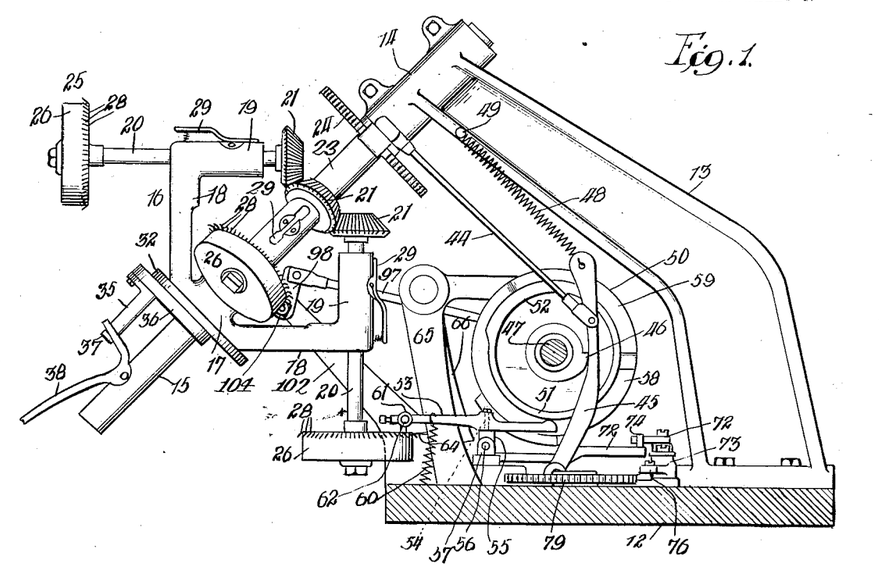
Figure 1 is a side elevation of the main portion of the machine, showing the bed plate in section and the driving mechanism removed.

In use, the body of the sock and the upper of the sock are turned inside out and mounted together upon the disengaged carrier head which occupies the center position, as shown in Fig. 1. In order to properly position the fabric, the carrier head will be retracted to a position in which the bevel pinion will be thrown out of mesh with the center driving bevel pinion. This operation is performed by depressing the end of the spring lever 29 to raise the pin, carried by the opposite end of the lever, out of the groove in the stub shaft, which allows the shaft to be moved longitudinally a sufficient distance to unmesh the gearing. This independent adjustment of each of the carrier heads permits the three operations of clipping, stitching and brushing to be carried on automatically with the three other carrier heads while the operator is mounting the fabric on the fourth carrier head. This mounting is performed by distending the body of the sock and the upper into tubular formation and entering the circular row of pins through the two fabrics so distended. After the fabric has thus been mounted, the operator waits until all of the other three operations have been performed on the remaining carrier heads, after which the machine will be thrown out of operation, as will be hereinafter explained. At the proper time the operator depresses the lever 38, which throws back the stop pin 34, and allows the rotary carrier to be revolved a quarter of a revolution. This brings the carrier head, with the fabric mounted thereon, into close proximity with the tip ends of the shears. The lowermost carrier head is meanwhile thrown into position to receive the stitching; and the carrier head, which has previously occupied the stitching position, is thrown up into coacting position with the brush. The last carrier head meanwhile has been moved from brushing position to the upper center position, which it occupies while the operator is removing a completed sock therefrom and applying the two sections of an unfinished sock thereto. The three carrier heads, which are in operative positions, simultaneously receive an equal and intermittent rotation from the center driving bevel pinion which is actuated intermittently by the ratchet wheel 24. Simultaneously the movable member of the shears will be rocked on its pivot, thereby coacting with the stationary member in clipping off the surplus fabric projecting from the edge of the carrier head which is in shearing position; and this action will continue until a complete revolution of the carrier head has been made. Simultaneously the carrier head which is in stitching position will receive the needle which coacts with the looper in the usual manner, and the stitching will continue as the carrier head is intermittently revolved in proximity to the needle and the looper. In like manner the last carrier head, which has been moved to brushing position will coact with the brush during the complete revolution of the head.

In order that the ends of the stitching may overlap slightly, the stop ratchet wheel 79 is preferably provided with a greater number of teeth than the driving ratchet wheel 24, so that the latter will make a complete revolution before the former. The stop ratchet wheel is actuated one point with each reciprocation of the needle, and the driving ratchet wheel is moved one point during the same period. The stop ratchet wheel will continue to revolve until the stop pin 80 is brought against the foot of the bell crank lever 82, which thereafter will be moved slightly by the engagement of the stop pin which rides under the heel of the foot, thereby throwing the upper end of the bell crank lever against the stop 84 on the bar 85. This action retracts the bar 85, withdrawing the tooth 86 from the notch within which it registers. This retraction of the tooth allows the pressure of the driving belt to act against the idler 92 which is thrown into position to relieve the belt from all tension, which of course stops the machine.

Figure 13:
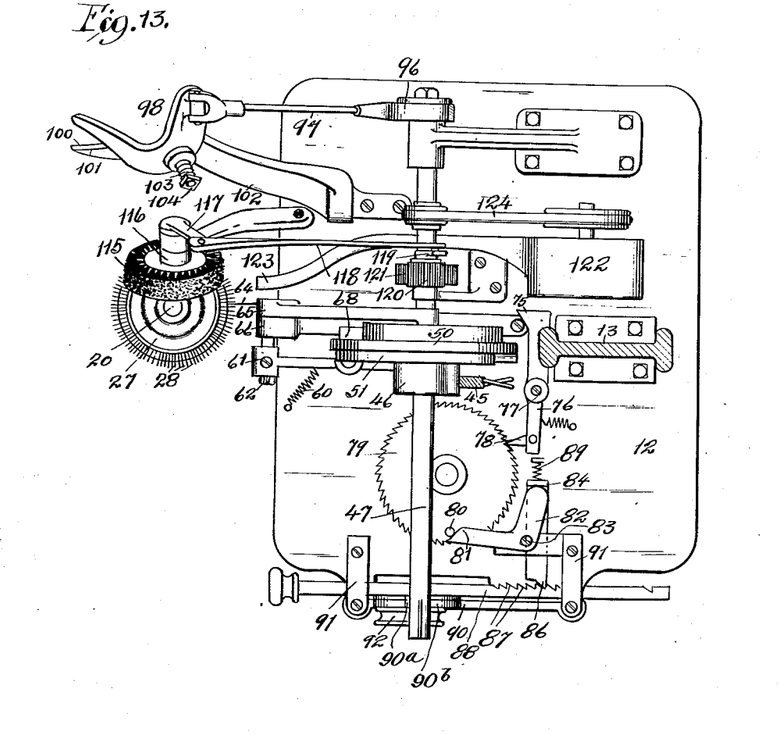
Fig. 13 a slightly modified form of the machine, showing a different arrangement of the brush mechanism; and Fig. 14 a modified form of brush crank mechanism.
Figure 14:
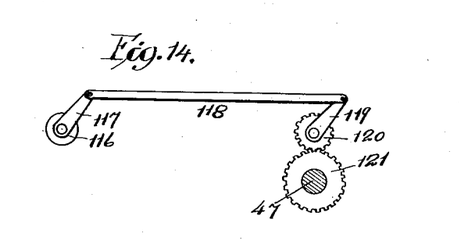

Figs. 13 and 14 show a slightly modified arrangement of the brush mechanism, and also the application of a blower for removing the lint from the fabric in the vicinity of the needle.

Referring to Fig. 12, it will be noted that the brush 115 occupies a position immediately above the carrier head when in stitching position, being mounted upon a stub shaft 116 having on its end a crank 117 which is connected by a pitman 118 with a crank 119 of equal length, which is connected with a transmission gear wheel 120 which receives its rotation from a driving gear wheel 121 on the main shaft.

Aside from the fact that in Fig. 12 the cranks are of equal length in order to impart a complete revolution to the brush, rather than a partial revolution thereto, the mechanism differs not at all from the brush mechanism previously described. It is found desirable in certain cases to employ a blower or other suitable device to create a blast of air which will strike the fabric beneath and around the brush operating on the stitching head in order to remove an accumulation of fine lint at this point.

122 indicates a blower provided with a nozzle 123 adapted to direct a current of air toward the brush at its point of contact with the fabric. The blower is driven by means of a belt 124 which receives its impetus from the power shaft. Obviously other methods of securing the blast could be employed.

What I regard as new and desire to secure by Letters Patent is:

1. In a looping machine, the combination of shearing mechanism and stitching mechanism, means for actuating the two sets of mechanisms, a movable carrier having a plurality of carrier heads mounted to permit the heads to be successively carried to different points of operation, means for rotating said heads when positioned at points of operation, and means for disengaging each of said heads from its rotating means whereby each of said heads may be moved to a non-operative position, without stopping the operation of the remaining heads, substantially as described.

2. In a looping machine, the combination of shearing mechanism and stitching mechanism, means for actuating the two sets of mechanisms, a revoluble carrier provided with a plurality of carrier heads adapted to be successively turned to different points of operation, means for rotating said heads when positioned at points of operation, and means for disengaging each of said heads from its rotating means whereby each of said heads may be moved to a non-operative position, without stopping the operation of the remaining heads, substantially as described.

3. In a looping machine, the combination of shearing mechanism, stitching mechanism and brushing mechanism, means for operating the several mechanisms, a movable carrier provided with carrier heads adapted to be moved to different points of operation, means for rotating said head when positioned at points of operation and means for disengaging each of said heads from its rotating means whereby each of said heads may be moved to a non-operative position, without stopping the operation of the remaining heads, substantially as described.

4. In a looping machine, the combination of shearing mechanism, stitching mechanism and brushing mechanism, means for operating the several mechanisms, a revoluble carrier provided with a plurality of carrier heads adapted to be turned to different points of operation, means for rotating said heads when positioned at points of operation and means for disengaging each of said heads from its rotating means whereby each of said heads may be moved to a non-operative position, without stopping the operation of the remaining heads, substantially as described.

5. In a looping machine, the combination of shearing mechanism, stitching mechanism and brush mechanism, a power shaft, means actuated by the power shaft for operating the three sets of mechanisms, a carrier provided with a plurality of carrier heads movable to different points of operation, means for simultaneously rotating all of the carrier heads when positioned at points of operation and means for disengaging each of said carrier heads from said rotating means, substantially as described.

6. In a looping machine, the combination of shearing mechanism, stitching mechanism and brush mechanism, a power shaft, means actuated by the power shaft for operating the three sets of mechanisms, a rotary carrier provided with a plurality of carrier heads, gearing actuated from the power shaft for simultaneously rotating all of the carrier heads when moved to positions of operation, and means for disengaging each of the carrier heads from the gearing, substantially as described.

7. In a looping machine, the combination of shearing mechanism, stitching mechanism and brush mechanism, means for actuating the several mechanisms, a rotary carrier comprising a head and four arms spaced equidistantly and extending obliquely with respect to the axis of the head, each of the arms having a journal mounting at an angle with respect to the arm, a shaft extending obliquely with respect to the arms, upon which shaft the revoluble head is mounted, a stub shaft entered through each of the journal mountings and having at its outer end a carrier head and having at its inner end a bevel pinion, a driving bevel pinion centrally mounted on the shaft, and means for imparting intermittent movement to the carrier heads, substantially as described.

8. In a looping machine, the combination of shearing mechanism, stitching mechanism and brush mechanism, means for actuating the several mechanisms, a rotary carrier comprising a head and four arms spaced equidistantly and extending obliquely with respect to the axis of the head, each of the arms having a journal mounting at an angle with respect to the arm, a shaft extending obliquely with respect to the arms, upon which shaft the revoluble head is mounted, a stub shaft entered through each of the journal mountings and having at its outer end a carrier head and having at its inner end a bevel pinion, a driving bevel pinion centrally mounted on the shaft, means for imparting intermittent movement to the carrier heads, each of the stub shafts being adapted for longitudinal movement to disengage the bevel pinion thereon from the driving bevel pinion, substantially as described.

9. In a looping machine, the combination of shearing mechanism, stitching mechanism and brush mechanism, means for actuating the several mechanisms, a rotary carrier comprising a head and four arms spaced equidistantly and extending obliquely with respect to the axis of the head, each of the arms having a journal mounting at an angle with respect to the arm, a shaft extending obliquely with respect to the arms, upon which shaft the revoluble head is mounted, a stub shaft entered through each of the journal mountings, having at its outer end a carrier head and having at its inner end a bevel pinion, a driving bevel pinion centrally mounted on the shaft, a ratchet wheel connected with the driving bevel pinion, a dog for actuating the ratchet, a swinging arm with which the dog is connected, a rod for actuating the swinging arm, a pivoted arm to which the rod is connected, and a cam for actuating the pivoted arm, substantially as described.

10. In a looping machine, the combination of shearing mechanism, stitching mechanism and brush mechanism, means for actuating the several mechanisms, a rotary carrier comprising a head and four arms spaced equidistantly and extending obliquely with respect to the axis of the head, each of the arms having a journal mounting at an angle with respect to the arm, a shaft extending obliquely with respect to the arms, upon which shaft the revoluble head is mounted, a stub shaft entered through each of the journal mountings, having at its outer end a carrier head and having at its inner end a bevel pinion, a driving bevel pinion centrally mounted on the shaft, a ratchet wheel connected with the driving bevel pinion, a dog for actuating the ratchet wheel, a swinging arm with which the dog is connected, a rod for actuating the swinging arm, a pivoted arm to which the rod is connected, and a cam for actuating the pivoted arm, each of the stub shafts being adapted for longitudinal movement to disengage the bevel pinion thereon from the driving bevel pinion, substantially as described.

11. In a machine of the class described, a rotary carrier comprising a head having four arms extending therefrom at an oblique angle with respect to the axis of the head, each of the arms being provided at its end with an angularly disposed journal mounting extending inwardly toward the axis of the head, a stub shaft journaled within each of the mountings, carrier heads on the outer ends of the stub shafts, a driving bevel pinion adapted to mesh with all of the bevel pinions, a mounting for the rotary carrier, and means for actuating the driving bevel pinion, substantially as described.

12. In a machine of the class described, a rotary carrier comprising a head having four arms extending therefrom at an oblique angle with respect to the axis of the head, each of the arms being provided at its end with an angularly disposed journal mounting extending inwardly toward the axis of the head, a stub shaft journaled within each of the mountings, carrier heads on the outer ends of the stub shafts, a driving bevel pinion adapted to mesh with all of the bevel pinions, a mounting for the rotary carrier, means for actuating the driving bevel pinion, means for holding the bevel pinion on each of the stub shafts in mesh with the driving bevel pinion and permitting retraction of the shaft to disengage the pinions, and means for locking the rotary carrier in different positions of adjustment, substantially as described.

13. In a looping machine, the combination of a bed plate, a supporting frame, a stationary shaft carried by the supporting frame and extending obliquely with respect to the bed plate, a rotary carrier comprising a head revolubly mounted on the shaft, and four arms extending obliquely with respect to the axis of the head and the shaft, each of the arms terminating in a journal mounting in the form of a sleeve angularly disposed with respect to the arm, stub shafts journaled within the sleeves, bevel pinions on the inner ends of the stub shafts, carrier heads on the outer ends of the stub shafts, a driving pinion mounted on the stationary shaft and adapted to mesh with the pinions on the stub shafts, a ratchet wheel connected with the driving pinion, a dog engaging the ratchet wheel, a main power shaft, shearing, stitching and brush mechanisms actuated from the main power shaft, a cam on the main power shaft, members connected with the dog and adapted to be engaged by the cam for intermittently moving the ratchet wheel, a stop ratchet wheel provided with a stop pin, means for intermittently moving the stop ratchet wheel, and means actuated by the engagement of the stop pin for stopping the machine at a predetermined point, substantially as described.

14. In a looping machine, the combination of a bed plate, a supporting frame, a stationary shaft carried by the supporting frame and extending obliquely with respect to the bed plate, a rotary carrier comprising a head revolubly mounted on the shaft, and four arms extending obliquely with respect to the axis of the head and the shaft, each of the arms terminating in a journal mounting in the form of a sleeve angularly disposed with respect to the arm, stub shafts journaled within the sleeves, bevel pinions on the inner ends of the stub shafts, carrier heads on the outer ends of the stub shafts, a driving pinion mounted on the stationary shaft and adapted to mesh with the pinions on the stub shafts, a ratchet wheel connected with the driving pinion, a dog engaging the ratchet wheel, a main power shaft, shearing, stitching and brush mechanisms actuated from the main power shaft, a cam on the main power shaft members connected with the dog and adapted to be engaged by the cam for intermittently moving the ratchet wheel, a stop ratchet wheel provided with a stop pin, means for intermittently moving the stop ratchet wheel, a lever adapted to be thrown by the stop pin, a bar in engagement with the lever and provided in its end with a tooth, a notched bar carrying an idler belt wheel, a driving belt wheel on the main shaft, and a belt adapted to be tightened by the idler, the arrangement being one whereby a retraction of the toothed bar will permit the notched bar to spring back under the tension of the belt against the idler wheel, substantially as described.

15. In a looping machine, the combination of a driving shaft, a cam disk on the driving shaft, looping mechanism actuated thereby, an eccentric on the power shaft, shears actuated by the eccentric, a brush shaft, a brush mounted thereon, a crank on the shaft, a crank gear wheel having a shorter crank, a connection between the two cranks, a driving gear wheel on the driving shaft in mesh with the crank gear wheel, a pivoted arm in proximity to the cam disk, a cam on said disk actuating said arm at predetermined intervals, a pin on the end of said arm, a beveled finger engaging said pin, a pivoted arm on which the finger is mounted, a dog on the opposite end of said arm, a stop ratchet wheel actuated by said dog, a stop pin on said ratchet wheel, and releasing mechanism actuated by said stop pin for stopping the driving shaft at a predetermined point, substantially as described.

16. In a looping machine, the combination of a driving shaft, a cam disk on the driving shaft, looping mechanism actuated thereby, an eccentric on the power shaft, shears actuated by the eccentric, a brush shaft, a brush mounted thereon, a crank on the shaft, a crank gear wheel having a shorter crank, a connection between the two cranks, a driving gear wheel on the driving shaft in mesh with the crank gear wheel, a pivoted arm in proximity to the cam disk, a cam on said disk actuating said arm at predetermined intervals, a pin on the end of said arm, a beveled finger engaging said pin, a pivoted arm on which the finger is mounted, a dog on the opposite end of said arm, a stop ratchet wheel actuated by said dog, a stop pin on said ratchet wheel, a pivoted lever having one end within the path of travel of the stop pin, a toothed bar in engagement with the opposite end of said lever and adapted to be moved thereby, an idler bar having notches adapted to receive the tooth when projected, an idler belt wheel, a main belt wheel, and a belt adapted to be tightened on the main belt wheel by the idler when moved and held in proper position, substantially as described.

17. In a looping machine, the combination of a driving shaft, a cam disk on the driving shaft, looping mechanism actuated thereby, an eccentric on the power shaft, shears actuated by the eccentric, a brush shaft, a brush mounted thereon, a crank on the shaft, a crank gear wheel having a shorter crank, a connection between the two cranks, a driving gear wheel on the driving shaft in mesh with the crank gear wheel, a pivoted arm in proximity to the cam disk, a cam on said disk actuating said arm at predetermined intervals, a pin on the end of said arm, a beveled finger engaging said pin, a pivoted arm on which the finger is mounted, a dog on the opposite end of said arm, a stop ratchet wheel actuated by said dog, a stop pin on said ratchet wheel, a pivoted lever having one end within the path of travel of the stop pin, a toothed bar in engagement with the opposite end of said lever and adapted to be moved thereby, an idler bar having notches adapted to receive the tooth when projected, an idler belt wheel, a main belt wheel, a belt adapted to be tightened on the main belt wheel by the idler when moved and held in proper position, a rotary carrier provided with four carrier heads adapted to be successively moved to points of operation, and means for revolving said heads at a speed coördinate with the speed of the several mechanisms, substantially as described.

18. In a looping machine, the combination of a driving shaft, a cam disk on the driving shaft, looping mechanism actuated thereby, an eccentric on the driving shaft, shears actuated by the eccentric, a brush shaft, a brush mounted thereon, a crank on the shaft, a crank gear wheel having a shorter crank, a connection between the two cranks, a driving gear wheel on the driving shaft in mesh with the crank gear wheel, a pivoted arm in proximity to the cam disk, a cam on said disk actuating said arm at predetermined intervals, a pin on the end of said arm, a beveled finger engaging said pin, a pivoted arm on which the finger is moutned, a dog on the opposite end of said arm, a stop ratchet wheel actuated by said dog, a stop pin on said ratchet wheel, a pivoted lever having one end within the path of travel of the stop pin, a toothed bar in engagement with the opposite end of said lever and adapted to be moved thereby, an idler bar having notches adapted to receive the tooth when projected, an idler belt wheel, a main belt wheel, a belt adapted to be tightened on the main belt wheel by the idler when moved and held in proper position, a rotary carrier provided with four carrier heads adapted to be successively moved to points of operation, driving mechanism for simultaneously revolving all of the heads, means for disengaging any one of the heads from the driving mechanism, and a ratchet and dog mechanism, actuated by the main driving shaft, for imparting intermittent motion to the head driving mechanism, substantially as described.

FRITHIOF NELSON.
JOHN F. NELSON.

Witnesses:
SAML. H. RECK,
WALTER B. BROWN.